(12) United States Patent
Roddy et al.

(10) Patent No.: US 6,993,675 B2
(45) Date of Patent: Jan. 31, 2006

(54) METHOD AND SYSTEM FOR MONITORING PROBLEM RESOLUTION OF A MACHINE

(75) Inventors: Nicholas Edward Roddy, Clifton Park, NY (US); David Richard Gibson, North East, PA (US); Richard Gerald Bliley, Erie, PA (US)

(73) Assignee: General Electric Company, Schenectady, NY (US)

( * ) Notice: Subject to any disclaimer, the term of this patent is extended or adjusted under 35 U.S.C. 154(b) by 519 days.

(21) Appl. No.: 10/210,815

(22) Filed: Jul. 31, 2002

(65) Prior Publication Data

US 2004/0025082 A1 Feb. 5, 2004

(51) Int. Cl.
*G06F 11/00* (2006.01)

(52) U.S. Cl. .............................. 714/2; 701/19; 701/29; 714/48; 714/57; 379/9.03

(58) Field of Classification Search ................. 701/19, 701/39, 29, 35; 714/37, 2, 48, 26, 31, 57; 379/9.03
See application file for complete search history.

(56) References Cited

U.S. PATENT DOCUMENTS

| | | | |
|---|---|---|---|
| 4,062,061 A | 12/1977 | Batchelor et al. | |
| 4,270,174 A | 5/1981 | Karlin et al. | |
| 4,322,813 A | 3/1982 | Howard et al. | |
| 4,463,418 A | 7/1984 | O'Quin, II et al. | |
| 4,517,468 A | 5/1985 | Kemper et al. | |
| 4,521,847 A | 6/1985 | Ziehm et al. | |
| 4,695,946 A | 9/1987 | Andreasen et al. | |
| 4,823,914 A | 4/1989 | McKinney et al. | |
| 4,970,725 A | 11/1990 | McEnroe et al. | |
| 4,977,390 A | 12/1990 | Saylor et al. | |
| 5,023,817 A | 6/1991 | Au et al. | |
| 5,113,489 A | 5/1992 | Cihiwsky et al. | |
| 5,123,017 A | 6/1992 | Simpkins et al. | |
| 5,127,005 A | 6/1992 | Oda et al. | |
| 5,157,610 A | 10/1992 | Asano et al. | |
| 5,239,547 A | * | 8/1993 | Tomiyama et al. ........... 714/26 |

(Continued)

OTHER PUBLICATIONS

U.S. Appl. No. 09/285,612, filed Apr. 2, 1999, Anil Varma et al, pending.

(Continued)

*Primary Examiner*—Robert Beausoliel
*Assistant Examiner*—Christopher McCarthy
(74) *Attorney, Agent, or Firm*—William Scott Andes; Enrique J. Mora; Beusse, Brownlee, Wolter, Mora & Maire, P.A.

(57) ABSTRACT

A method and apparatus for determining when to close a problem case associated with a machine that includes identifying at least one failure condition associated with the problem case, determining whether the failure condition is repeated after a recommended fix instruction is executed and closing the problem case if the failure condition does not repeat within a predetermined amount of time after the fix instruction has been executed. The machine may be a remote machine such as a locomotive and electronic data indicative of the failure condition may be transmitted from the remote machine to a control center over a telecommunications medium such as the Internet. The control center may include a processor for managing the electronic data that may be transmitted from a plurality of remote machines. The control center processor may be adapted to request downloads from the remote machines and monitor downloaded data to determine whether the failure condition are repeating after the fix instruction has been executed.

25 Claims, 3 Drawing Sheets

U.S. PATENT DOCUMENTS

| | | | |
|---|---|---|---|
| 5,274,572 | A | 12/1993 | O'Neill et al. |
| 5,282,127 | A | 1/1994 | Mii |
| 5,287,505 | A | 2/1994 | Calvert et al. |
| 5,321,837 | A | 6/1994 | Daniel et al. |
| 5,329,465 | A | 7/1994 | Arcella et al. |
| 5,400,018 | A | 3/1995 | Scholl et al. |
| 5,406,502 | A | 4/1995 | Haramaty et al. |
| 5,445,347 | A | 8/1995 | Ng |
| 5,463,768 | A | 10/1995 | Cuddihy et al. |
| 5,507,457 | A * | 4/1996 | Kull ................... 246/169 R |
| 5,508,941 | A | 4/1996 | Leplingard et al. |
| 5,528,516 | A | 6/1996 | Yemini et al. |
| 5,566,091 | A | 10/1996 | Schricker et al. |
| 5,594,663 | A | 1/1997 | Messaros et al. |
| 5,596,712 | A | 1/1997 | Tsuyama et al. |
| 5,633,628 | A | 5/1997 | Denny et al. |
| 5,638,296 | A | 6/1997 | Johnson et al. |
| 5,661,668 | A | 8/1997 | Yemini et al. |
| 5,666,481 | A | 9/1997 | Lewis |
| 5,666,534 | A | 9/1997 | Gilbert et al. |
| 5,678,002 | A | 10/1997 | Fawcett et al. |
| 5,680,541 | A | 10/1997 | Kurosu et al. |
| 5,729,452 | A | 3/1998 | Smith et al. |
| 5,742,915 | A | 4/1998 | Stafford |
| 5,774,645 | A | 6/1998 | Beaujard et al. |
| 5,790,780 | A | 8/1998 | Brichta et al. |
| 5,799,148 | A | 8/1998 | Cuddihy et al. |
| 5,815,071 | A | 9/1998 | Doyle |
| 5,835,871 | A | 11/1998 | Smith et al. |
| 5,845,272 | A | 12/1998 | Morjaria et al. |
| 5,862,316 | A | 1/1999 | Hagersten et al. |
| 5,928,369 | A | 7/1999 | Keyser et al. |
| 5,950,147 | A | 9/1999 | Sarangapani et al. |
| 5,956,664 | A | 9/1999 | Bryan |
| 6,012,152 | A * | 1/2000 | Douik et al. ................... 714/26 |
| 6,052,631 | A | 4/2000 | Busch et al. |
| 6,078,851 | A | 6/2000 | Sugitani |
| 6,144,901 | A | 11/2000 | Nickles et al. |
| 6,175,934 | B1 | 1/2001 | Hershey et al. |
| 6,216,066 | B1 | 4/2001 | Goebel et al. |
| 6,243,628 | B1 * | 6/2001 | Bliley et al. ................... 701/29 |
| 6,246,950 | B1 | 6/2001 | Bessler et al. |
| 6,263,265 | B1 | 7/2001 | Fera |
| 6,301,531 | B1 | 10/2001 | Pierro et al. |
| 6,324,659 | B1 | 11/2001 | Pierro |
| 6,330,499 | B1 | 12/2001 | Chou et al. |
| 6,336,065 | B1 * | 1/2002 | Gibson et al. ................ 701/29 |
| 6,338,152 | B1 | 1/2002 | Fera et al. |
| 6,343,236 | B1 | 1/2002 | Gibson et al. |
| 6,345,257 | B1 | 2/2002 | Jarrett |
| 6,377,876 | B1 | 4/2002 | Hedeen et al. |
| 6,405,108 | B1 | 6/2002 | Patel et al. |
| 6,487,478 | B1 * | 11/2002 | Azzaro et al. ................ 701/24 |
| 6,622,264 | B1 * | 9/2003 | Bliley et al. ................... 714/26 |
| 6,634,000 | B1 * | 10/2003 | Jammu et al. ................ 714/37 |
| 6,636,771 | B1 * | 10/2003 | Varma et al. ................. 700/79 |
| 6,643,801 | B1 * | 11/2003 | Jammu et al. ................ 714/37 |
| 6,665,425 | B1 * | 12/2003 | Sampath et al. ............ 382/112 |
| 6,725,398 | B1 * | 4/2004 | Varma et al. ................. 714/25 |
| 6,782,345 | B1 * | 8/2004 | Siegel et al. ................ 702/183 |
| 6,795,935 | B1 * | 9/2004 | Unkle et al. ................... 714/37 |
| 6,834,219 | B2 * | 12/2004 | Proulx ......................... 701/19 |
| 2002/0087578 | A1 * | 7/2002 | Vroman ................... 707/104.1 |
| 2003/0208706 | A1 * | 11/2003 | Roddy et al. ................. 714/48 |

OTHER PUBLICATIONS

U.S. Appl. No. 09/688,105, filed Oct. 13, 2000, Anil Varma et al, pending.

Data-Tronic Gas Turbine Information And Control System; General Electric Gas Turbine Reference Library; 8 pgs.

Trobec R. et al; "Optimization Of Dianostic Examination"; Joint International Conference On Vector And Parallel Processing; Berlin De 1994, pp 761-772, XP000974309.

* cited by examiner

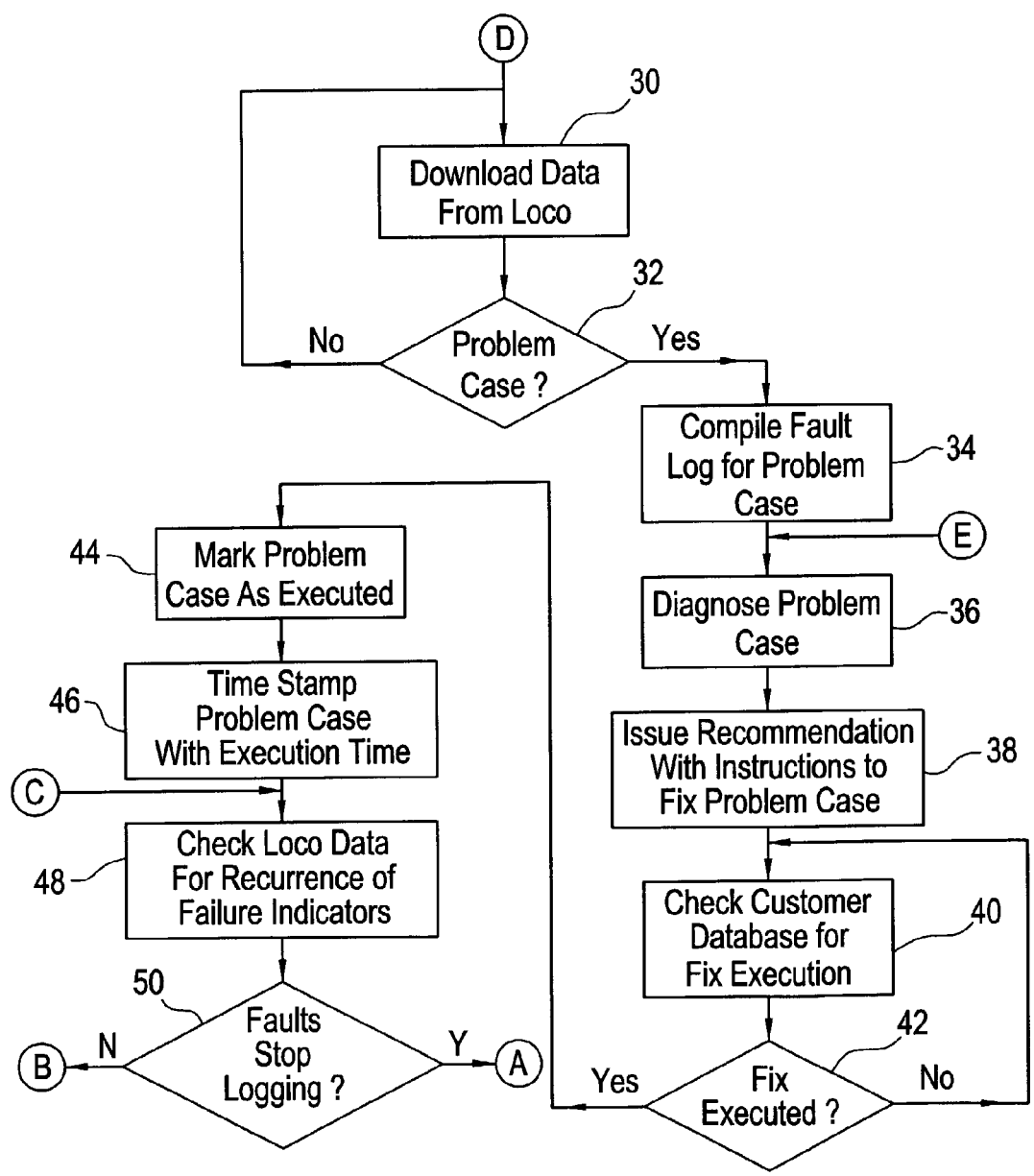

METHOD AND SYSTEM FOR MONITORING PROBLEM RESOLUTION OF A MACHINE

BACKGROUND OF THE INVENTION

This invention generally relates to machine diagnostics and repair and more particularly to a method and system for monitoring the resolution of malfunctions or breakdowns of machines, such as locomotives, once a diagnosis has been given to ensure that the malfunction or breakdown is properly repaired.

A locomotive is one example of a complex electromechanical system comprising a plurality of complex systems and subsystems. Many if not all of these systems and subsystems are manufactured from components that will fail over time. The operational parameters of a locomotive system or subsystem are frequently monitored during operation of the locomotive to detect potential failures. If a failure condition or a set of failure conditions is detected then a service technician may conduct a diagnostics examination of the failure conditions and make a recommendation for fixing the problem. Considering the complexity of locomotive systems and subsystems it is sometimes difficult to precisely identify a failed component or other cause of the failure conditions. This may be because the effects or problems that the failure has on the system or subsystem are often neither readily apparent in terms of their source nor unique. Sometimes the recommended fix for a problem may not resolve the problem due to the complexity of the problem and/or diagnostic efforts. With some components this is not a significant issue. For example, if a component has binary functionality in that it either works properly or it doesn't, such as a mechanical or electrical switch, then diagnosing, recommending a fix and determining that the fix corrected the problem is typically not too difficult. However, with more complex problems, conducting a diagnosis and recommending a proper fix may be more difficult. An improper diagnosis and/or recommended fix instruction may lead to the inefficient operation or underutilization of a locomotive or fleet of locomotives. This is turn may cause an economic loss to the locomotive or fleet operator, which the operator would rather avoid.

Diagnosing failure conditions associated with complex machines, such as systems and subsystems of a locomotive, may be performed by experienced personnel who have in-depth training and experience in working with a particular type of machine. Typically, these experienced individuals may use current and historical information associated with a problem that has been recorded in a written or electronic log. Using this information the technicians apply their accumulated experience, knowledge and training in mapping incidents occurring in a complex system and/or subsystem to problems that may be causing the incidents. Computer-based systems are also used to automatically diagnose problems in a machine to overcome some of the disadvantages associated with relying completely on experienced personnel. This may increase the speed and consistency of the diagnosis. Computer-based systems are becoming more popular and may utilize a mapping between the observed failure conditions and the equipment problems using techniques such as look up tables, symptom-problem matrices, and/or production rules, for example. These techniques work well for simplified systems having simple mappings between symptoms and problems. However, more complex equipment and process diagnostics seldom have such simple correspondences. Consequently, recommended fix instructions may be made that do not solve a problem immediately or completely. This may not be determined for sometime after the fix was executed if monitoring the consequences of an executed fix is predominantly performed manually. Not determining expeditiously that an executed fix instruction did not work may lead to recommending the same improper fix when that problem is next identified.

Accordingly, it is desirable to provide an automated method and system for monitoring the resolution of problems associated with a machine, such as a locomotive, and verifying that an executed fix instruction has resolved that problem. Monitoring and expeditiously verifying the resolution of problems with a locomotive's systems and/or subsystems is advantageous because this ability may minimize overall locomotive downtime leading to a significant cost savings for the operator of the locomotive or a fleet of locomotives.

BRIEF DESCRIPTION OF THE INVENTION

The present invention fulfills the foregoing needs by providing in one exemplary embodiment thereof a method and system for determining whether to close a problem case associated with a machine, the problem case identifying a potential malfunctioning condition of the machine and defined by an occurrence of at least one failure condition of the machine, the method comprising acquiring a first set of operational data, the first set of operational data indicative of a first set of operational parameters associated with the machine, the first set of operational parameters being measured prior to a recommended fix instruction being executed wherein the first set of operational data contains the at least one failure condition; acquiring a second set of operational data, the second set of operational data indicative of a second set of operational parameters associated with the machine, the second set of operational parameters being measured after the recommended fix instruction is executed; determining whether the at least one failure condition is contained in the second set of operational data; and closing the problem case if the at least one failure condition is not contained in the second set of operational data.

One exemplary embodiment of the present invention allows for data indicative of operational parameters of a machine, such as a locomotive, to be transmitted to a remote control center. The control center may include a database and a processor for analyzing the data to identify a condition of the machine that needs to be repaired. The processor may include a module for diagnosing the failure condition and issuing the recommended fix instruction. The processor may also include a module for analyzing the data indicative of the machine's operational parameters to determine whether the failure condition has repeated. If the failure condition has repeated after the recommended fix has been executed then one aspect of the present invention allows for the associated problem case to be reopened. Once reopened the data indicative of the operational parameters may be analyzed again to identify a second condition of the machine that needs to be repaired. A second recommended fix instruction may be issued to repair the second condition. The problem case may be closed when the failure condition does not repeat within a predetermined period of time.

BRIEF DESCRIPTION OF THE DRAWINGS

FIG. 2A is a flow diagram of one exemplary aspect of the present invention; and

DETAILED DESCRIPTION OF THE INVENTION

Figure 1:
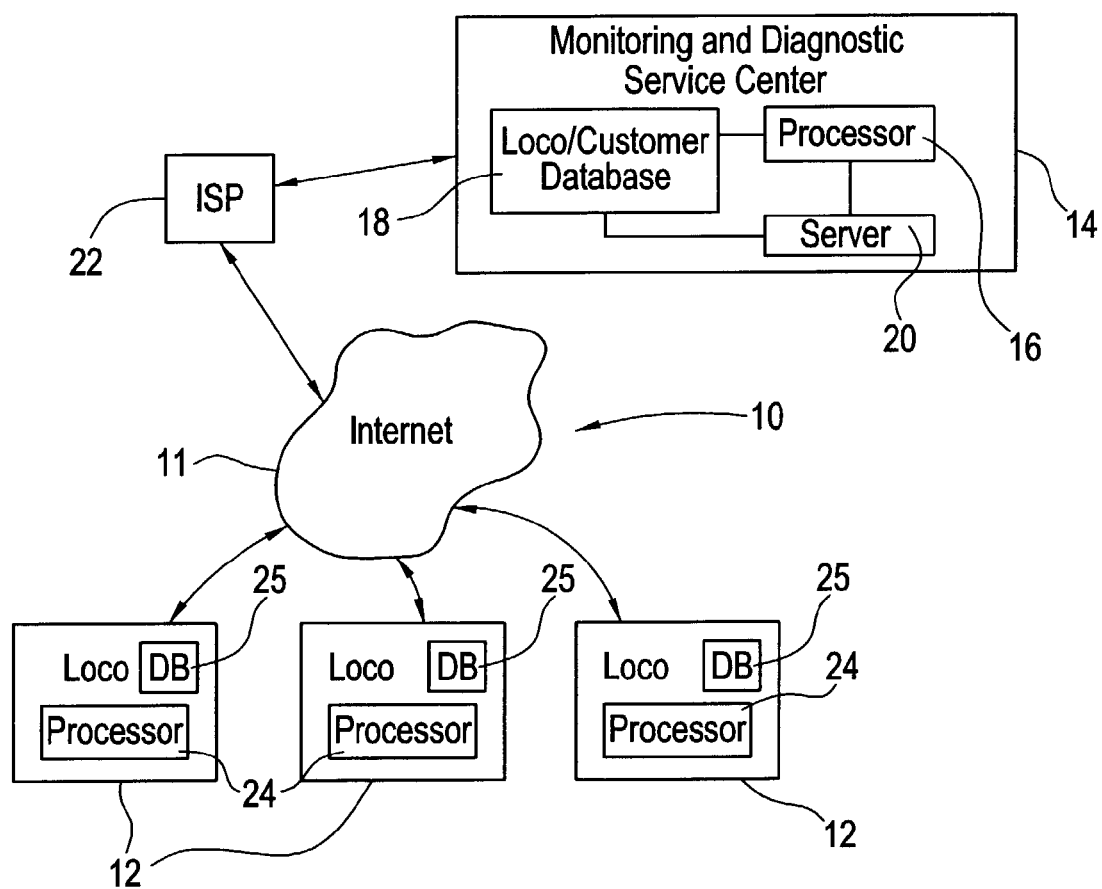
FIG. 1 is a schematic representation of an exemplary telecommunications system that may be used to implement at least one aspect of the present invention.

FIG. 1 illustrates an exemplary telecommunications system 10 that may be used to implement at least one aspect of the present invention. The telecommunications system 10 may include using the Internet 11 for a wireless or hard wire connection between a plurality of mobile or fixed assets and a centralized control and/or service center 14. In one exemplary embodiment of the present invention each asset may be a vehicle used for transportation such as a locomotive 12, for example, and the centralized control center 14 may be a monitoring and diagnostic service center ("MDSC") such as one managed and operated by the assignee of the present invention. The control center 14 may be remotely located from the locomotives 12 and may include conventional computer processing components such as a processor 16, a Loco/Customer database 18 and a server 20. The processor 16 may include a variety of processing modules capable of executing computer-readable code for implementing aspects of the present invention. The control center 14 may be connected with the Internet 11 by virtue of a conventional Internet service provider ("ISP") 22 that may offer hard line, wireless, optical, infrared or other means for exchanging data. As illustrated in FIG. 1, the telecommunications system 10 allows for data such as electrical data to be exchanged between the control center 14 and the locomotives 12. It will be recognized by those skilled in the art that various embodiments of the present invention may be executed as an application service provider ("ASP") model. For instance, with an ASP model the executable computer code used for implementing aspects of the present invention and associated databases may reside on a centralized server that may be accessed by the control center 14 and/or individual mobile assets such as locomotives 12.

Each locomotive 12 may include a plurality of onboard systems and subsystems that may be monitored and/or controlled by an onboard processor 24. As will be appreciated by those skilled in the art, a locomotive 12 may include a wide range of onboard systems and subsystems that range in their complexity from simple to sophisticated. The onboard processor 24 may function as an onboard monitoring and/or diagnostic system that keeps track of any incidents occurring in the onboard systems and subsystems by recording those incidents in an incident log. The incident log may be represented as an electronic data file or files and the associated incidents may be logged by using a system of identification codes associated with the incidents. The incident log may be stored in an onboard database 25 that is accessible and controllable by the processor 24. The onboard processor 24 may include a programmable diagnostic system for issuing recommended fix instructions responsive to an analysis of data in the incident log. Each onboard processor 24 may be configured to be in communication with the telecommunications system 10 so that data may be exchanged between the locomotives 12 and the control center 14. One exemplary embodiment of the present invention allows for data associated with one or more of a locomotive's 12 onboard systems and subsystems to be transmitted over a telecommunications medium, such as the Internet 11, to the control center 14 where it may be downloaded, stored in database 18 and analyzed. For example, during operation of a locomotive 12, the onboard processor 24 may monitor and compile data associated with each of the locomotive's onboard systems and subsystems. This data may include information associated with an onboard system's failure conditions and may include an incident log or logs of such categorized information. This information may be transmitted at predetermined intervals to the remote control center 14 or it may be received there on demand by an end user, for example. The data may be transmitted over the telecommunications medium 10 or it may be communicated by other means as will be recognized by those skilled in the art. The control center server 20 and/or processor 16, and the onboard processors 24 may be configured to be Web-enabled and each may include a conventional Web browser to enable their exchange of electronic data over the telecommunications medium 10.

One aspect of the present invention allows for the control center 14 to request that one or more locomotives 12 transmit information to the control center 14. The information peculiar to any one locomotive 12 may include a fault log, failure conditions, snapshots of predetermined operational parameters and/or conditions, statistics, road number, current time, current date, requester ID, etc. The fault log may include a substantially complete list of faults of systems and/or subsystems of a particular locomotive 12, including respective times of occurrence and reset times, if any, for example. The fault log may further provide fault description, failure conditions, statistics and any other associated information relating to a fault that may assist personnel of the control center 14, for example, to diagnose the fault or problem and make a recommendation for fixing the problem or fault. Each respective fault may have a predetermined data pack that contains information specific to that fault and may include information pertaining to a locomotive's 12 conditions, such as the locomotive's 12 operational parameters, just prior to a fault being logged. Statistical information pertaining to a locomotive 12 may include historical locomotive information contained in a fault log, such as historical information pertaining to engine duty cycle and may include respective line histories of locomotive notch time, mileage and total power generated by the engine of the locomotive 12, for example.

Figure 2B:
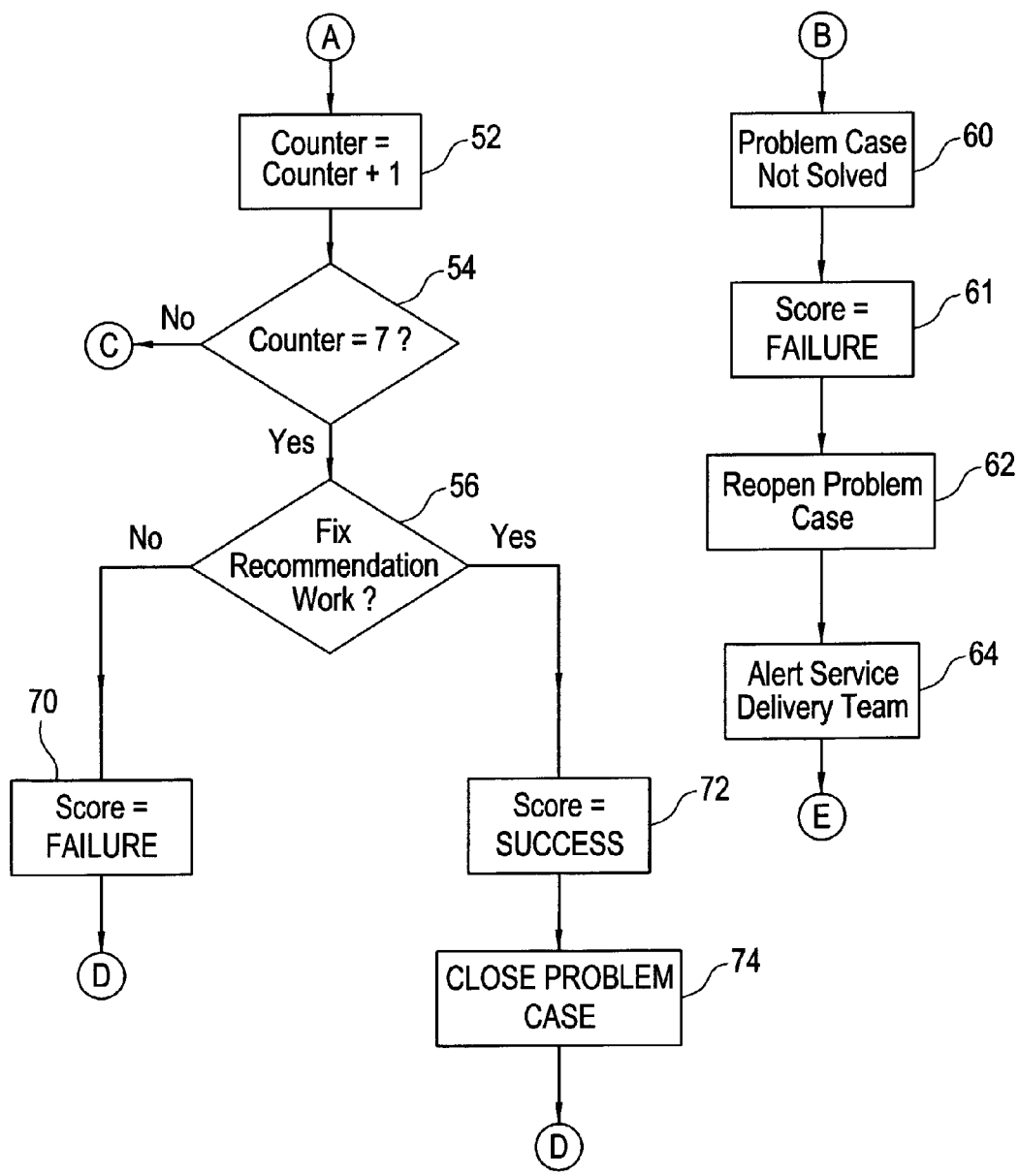
FIG. 2B is a continuation of the flow diagram of FIG. 2A.

FIG. 2A illustrates a flow diagram of one aspect of the present invention that allows in step 30 for data to be downloaded from one or more of the locomotives 12 over the telecommunications medium 10 to the remote control center 14. The downloaded data may be stored using conventional software on the Loco/Customer database 18 for analysis to diagnose a fault, problem or other trouble with a respective locomotive 12. Step 32 allows for determining from the downloaded data whether a problem case exists for a particular locomotive 12. In an alternate embodiment the problem case may be determined by analysis onboard locomotive 12, for example, before the associated data is transferred from the locomotive 12 to the remote control center 14. A problem case may exist based on any anomalous condition associated with the locomotive 12 and identify a condition of the locomotive's 12 onboard systems, subsystems and/or other components that need to be repaired to bring them within an acceptable range of operational performance. The term repair as used herein includes conventional repair work and may also include other types of work performed on locomotive 12 such as replacing parts, conventional maintenance services and/or other service work. The problem case may be determined based on the presence of certain anomalies of a locomotive's 12 systems, subsystems and/or other components within the downloaded data, for example. A problem case may be defined by at least one fault condition associated with the condition of a locomotive 12 to be repaired and may be "opened" as an electronic data file for tracking events through to closing the problem case. The electronic data file may pertain to a specific customer and may contain customer specific information as well as information pertaining to the diagnosis and resolution of the problem case. A problem case may be established by detecting any anomalous condition associated with a locomotive's 12 operational parameters and/or by using conventional diagnostic techniques and/or tools such as Case Based Reasoning, Bayesian Belief Network and any other suitable analysis tools. Data may be downloaded from one or more locomotives 12 at predetermined intervals, on demand at the request of the control center 14 or transmitted proactively by an operator of a locomotive 12, for example. As each batch of data is downloaded to the control center 14 it may be analyzed immediately or at a later time to determine whether a problem case exists. A problem case may also be determined to exist, for example, by the recognition of a data file that has been flagged as a problem case prior to its arrival at the control center 14. If no problem case exists within a batch of data then step 32 allows for returning to step 30 to allow for another batch of data to be downloaded to the control center 14 and analyzed for the presence of a problem case. Alternate embodiments may allow for data to be continuously transmitted by one or more locomotives 12 to the control center 14 where it may be analyzed to determine whether a problem case exists in real time or near real time. Another alternate embodiment may allow for the diagnostics to be performed by a particular locomotive's 12 respective onboard processor 24. When the diagnostics is complete data associated with a problem case may be transmitted over the telecommunications medium 10 to the control center 14 where a technician, for example, may develop and transmit a recommended fix instruction back to the respective locomotive 12.

If a problem case is identified in step 32 then step 34 allows for a fault log to be compiled for that problem case. The fault log may include a wide range of data associated with the problem case that may assist a technician and/or an automated diagnostics tool to diagnose the problem case in step 36. After diagnostics, step 38 allows for a recommended fix instruction for the problem case to be issued based on the diagnosis of step 36. The recommended fix instruction may be issued over the telecommunications medium 10 to the database of a customer responsible for repairing the problem of the respective locomotive 12. A recommended fix instruction may be issued in various ways and in one exemplary embodiment may issue over an Internet 11 connection using a business-to-business ("B2B") application program between the control center 14 and the appropriate customer database. After issuing the recommended fix instruction, step 40 allows for checking the customer's database, which may be located at a customer facility, to determine whether the recommended fix instruction has been executed. In one exemplary embodiment this may be accomplished with a B2B connection between the customer's database, regardless of its location, and the control center 14, for example, and may be done automatically or manually. For example, step 40 allows for executing a computer readable software module to automatically request a first set of repair data be transmitted from the locomotive 12 to the control center 14. Data associated with a repair made in response to the recommended fix instruction may be transmitted over the telecommunications medium 10 when the fix instruction has been executed. This repair data may be stored in the customer's database and/or a respective database 25 of a locomotive 12 and may be indicative of whether the recommended fix instruction has been executed. The repair data may also be indicative of the steps performed in making the repair, equipment that was used and/or of operational parameters associated with the condition of the locomotive 12 that was repaired, for example. The customer's database may be associated with the Loco/Customer database 18 or it may be another database provided that, in one exemplary embodiment, the control center 14 is enabled to communicate with the database to determine whether a recommended fix instruction has been executed. If the recommended fix instruction has been executed then step 44 allows for the associated problem case, which may be represented as an electronic data file stored in database 18 for example, to be marked as executed and moved to a specific queue. Step 46 may then allow for that problem case data file to be time stamped with the execution time of the recommended fix instruction for accurate tracking of the problem case resolution and closing.

After determining that a recommended fix instruction for a problem case has been executed in step 42 it is desirable to determine whether the condition of a locomotive 12 defined by the problem case has actually been repaired. This may be accomplished by continually monitoring the failure condition or conditions and/or fault indicators upon which the problem case was defined to determine whether they stop occurring. If they stop occurring within a predetermined period of time after the recommended fix instruction has been executed then the problem case may be closed. In an alternate embodiment, the failure conditions may not stop occurring but they may occur at levels sufficient to conclude that the problem case is fixed and may be closed. One exemplary embodiment allows for monitoring the failure conditions and/or other operating parameters associated with a condition of a machine to be conducted by using an automatic health check application program. The automatic health check program may be an on-demand software application that will automatically check specific failure conditions and/or operating parameters of a machine, such as a repaired locomotive for example, after the recommended fix instruction has been executed. The health check program may be of a type known in the art and may use a telecommunications medium 10 to execute the inquiry. The failure conditions and/or operating parameters acquired by the health check program may be compared to the corresponding conditions and/or parameters upon which the problem case was defined. In one aspect of the present invention step 48 allows for the checking of data for the recurrence of the original failure indicators associated with the respective problem case since the execution time stamped in step 46. The original failure conditions may include fault data and/or other continually generated data regarding operational parameters of a machine. Examples of such data are the rpm of a piece of rotating equipment or the temperature of various coolants or other fluids, for example. Such data may be transmitted from the respective locomotive 12 to the control center 14.

For example, after a recommended fix instruction has been executed data such as the operational parameters from the respective locomotive's 12 systems and subsystems may be transmitted from the locomotive 12 to the control center 14 for analysis. The analysis may include determining in step 50 whether faults associated with a respective problem case have stopped logging in a fault log stored in the respective locomotive's 12 database 25, for example. In this respect, the set of operational parameters of the respective locomotive 12 measured prior to the execution of the recommended fix instruction may be compared to the same set of operational parameters measured after execution of the recommended fix instruction. If the faults associated with the problem case, which may also be referred to as failure conditions, have stopped logging at a predetermined point in time then a counter may be set to equal "counter+1" in step 52. As will be recognized by those skilled in the art the counter may initially be set to equal zero so that the counter may sum the passage of increments of time. In an alternate exemplary embodiment the counter may be set in step 52 when a set of machine operating conditions associated with the problem case have remained in an acceptable range for an acceptable period of time even though one or more of the faults associated with the respective problem case may not have stopped logging.

One aspect of the present invention allows for establishing a predetermined amount of time to be used as a measure for determining whether a problem case has been resolved and should therefore be closed. For example, the counter in step 52 may be increased by 1 for each 24-hour period within which the faults have stopped logging or the machine operating conditions have remained in an acceptable range. Alternate embodiments may increase the counter using different increments of time and the overall period of time for determining whether a problem case should be scored a success may also vary as a function of the circumstances of any particular problem case. For example, some problem cases may not be too difficult to diagnose based on fault log data and/or other failure indicators. Historical data associated with such problem cases may indicate that a recommended fix instruction has a high probability of repairing the problem case. In this respect, the counter in step 54 may be set low. Similarly, the diagnosis of more difficult problem cases may command a longer period of time before scoring the problem case a success to ensure that a sufficient amount of data is collected to conclude that the problem case is repaired and may be closed.

If the counter in step 54 equals seven, for example, then step 56 allows for determining whether the recommended fix instruction issued in step 38 was responsible for repairing the condition associated with the problem case. This determination may be made by communication between the control center 14 and personnel operating the respective locomotive 12 and/or the analysis of data acquired from the locomotive 12 after the recommended fix instruction has been executed. Determining whether the condition associated with the problem case of a locomotive 12 has been repaired may be based on information obtained from the respective customer's database pertaining to that locomotive 12 and the associated problem case. If the recommended fix instruction is not responsible for fixing the condition associated with the problem case then step 70 allows for scoring the problem case a failure. The process may then return to step 30 to download data from one or more locomotives 12 and proceeding accordingly. In this respect, step 30 allows for downloading an updated set of operational data indicative of the then current set of operational parameters of the locomotive 12. An updated recommended fix instruction may be issued in step 38 based on an updated diagnosis of the problem case in step 36. If the recommended fix instruction was responsible for fixing the condition associated with the problem case then step 72 allows for scoring that problem case a success and step 74 allows for closing the problem case. The process may then return to step 30 for downloading data from one or more locomotives 12 and proceeding accordingly. A problem case may be closed by designating the associated electronic data file as closed or by similarly designating associated written records that a problem case has been resolved and the matter is being closed. The information associated with the problem case may be archived and/or it may be used for diagnosing future problem cases. In one exemplary embodiment of the present invention, a problem case may be closed in step 74 by personnel onboard a locomotive 12. Step 74 allows for the closing of the problem case to be reported to a remote service center such as the MDSC 14.

Returning to step 50, if the faults and/or failure conditions upon which the recommended fix instruction was based have not stopped logging in step 50 then the associated problem case may be designated as not solved in step 60. In an alternate exemplary embodiment step 50 may allow for determining whether a set of machine operating conditions have not remained in an acceptable range for a sufficiently long period of time. If they have not then that problem case may be designated as not solved in step 60. In either case, the problem case designated as not solved in step 60 may then be re-opened in step 62 and a service delivery team may be alerted in step 64 that a problem case has been re-opened. Step 61 allows for scoring the problem case for which the faults and/or failure conditions have not stopped logging as a failure. In one exemplary embodiment of the present invention when a problem case is re-opened in step 62 and the service delivery team is notified in step 64 the process may return to step 36 and a new diagnosis of the existing fault log data collected in step 34 may be conducted. A new recommended fix instruction may then be issued in step 38 and the process may proceed accordingly to determine if the new recommended fix instruction solves the problem case. An alternate exemplary embodiment allows for returning to step 30 when a problem case is re-opened in step 62 to allow for additional data to be downloaded from a locomotive 12. This additional data may provide additional information to the service delivery team for diagnosing a problem case in step 36 that it did not have when the problem case was first diagnosed.

Various exemplary embodiments of the present invention may be executed from a computer-usable medium such as a floppy disk or a CD, for example. The computer-usable medium may also be part of the ASP model and may reside on an ASP server, processor and/or database. The computer-usable medium may include a set of computer-executable code that includes a variety of modules for executing aspects of the present invention. A module may be a portion of the executable code, such as a subroutine, for performing specific tasks and/or steps to accomplish discrete tasks. For example, the set of computer executable code may execute the steps of analyzing a set of failure conditions to identify a problem case associated with a machine where the problem case defines a condition of the machine that needs to be repaired. The code may allow for determining whether a recommended fix instruction has been executed by analyzing information in a customer's database, for example. The customer's database may be accessible over the telecommunications medium 10. The code may also allow for analyzing a set of data indicative of a set of operating parameters of the machine to determine whether the condition has been repaired. The condition may be considered repaired if the associated failure conditions defining the problem case do not repeat within a predetermined period of time after the recommended fix instruction has been executed. If the condition has been repaired then the code allows for closing the problem case.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be interpreted in light of the spirit and scope of the appended claims.

What is claimed is:

1. A method for determining whether to close a problem case associated with a machine, the problem case identifying at least one failure condition of the machine, the method comprising:

acquiring a first set of operational data, the first set of operational data indicative of a first set of operational parameters associated with the machine, the first set of operational parameters being measured prior to a recommended fix instruction being executed wherein the first set of operational data contains the at least one failure condition;

acquiring a second set of operational data, the second set of operational data indicative of a second set of operational parameters associated with the machine, the second set of operational parameters being measured after the recommended fix instruction is executed;

determining whether the at least one failure condition is contained in the second set of operational data;

closing the problem case if the at least one failure condition is not contained in the second set of operational data;

creating an electronic data file associated with the problem case, the electronic data file containing a set of data indicative of a customer's information and the machine's information;

storing the electronic data file in a customer database;

determining whether the recommended fix instruction repaired the at least one failure condition;

marking the electronic data file as a success if the recommended fix instruction repaired the at least one failure condition;

marking the electronic data file as a failure if the recommended fix instruction did not repair the at least one failure condition;

marking the electronic data file as a re-opened problem case;

issuing an updated recommended fix instruction;

acquiring an updated set of operational data, the updated set of operational data indicative of an updated set of operational parameters associated with the machine, the updated set of operational parameters being measured after the updated recommended fix instruction is executed; and closing the re-opened problem case if the at least one failure condition is not contained in the updated set of operational data.

2. The method of claim 1, the steps of acquiring a first set and a second set of operational data comprising:

downloading the first and second set of operational data to a remote service center; and storing the first and second set of operational data in a customer database.

3. The method of claim 1 further comprising:

reporting the closing of the problem case to a remote service center.

4. The method of claim 1, wherein the electronic data file contains data indicative of customer and machine specific information associated with the problem case and further comprising:

marking the electronic data file as executed if the recommended fix instruction has been executed; and time stamping the electronic data file with a time that the recommended fix instruction was executed.

5. The method of claim 4, the step of closing the problem case further comprising marking the electronic data file as closed if the at least one failure condition is not contained in the second set of operational data within a predetermined period of time measured from the time that the recommended fix instruction was executed.

6. The method of claim 1 further comprising:

delivering a message to a service delivery team alerting the team that the problem case has not been solved if the at least one failure condition is contained in the second set of operational data.

7. The method of claim 1 wherein the step of determining is conducted at a remote service center.

8. The method of claim 1 further comprising:

acquiring a set of repair data, the set of repair data indicative of whether the recommended fix instruction has been executed; and analyzing the set of repair data to determine whether the recommended fix instruction has been executed.

9. The method of claim 1 further comprising:

diagnosing the problem case by associating the occurrence of the at least one failure condition with a set of potential malfunctioning conditions of the machine; and issuing the recommended fix instruction based on the diagnosis of the problem case.

10. A method for managing data to determine whether to close a problem case associated with at least one locomotive, the method comprising:

downloading a first set of data from the at least one locomotive to a remote control center, the first set of data indicative that the problem case exists in association with the at least one locomotive;

identifying at least one failure condition associated with the problem case;

downloading a second set of data from the at least one locomotive to the remote control center, the second set of data indicative of a set of operational parameters associated with the at least one locomotive, the second set of operational parameters being determined after a first recommended fix instruction has been executed in relation to the at least one locomotive;

closing the problem case if the at least one failure condition is not contained in the second set of data;

creating an electronic data file associated with the problem case;

marking the electronic data file as a failure if the recommended fix instruction did not repair the at least one failure condition;

re-opening the problem case in the event the recommended fix instruction did not repair the at least one failure condition;

transmitting a second recommended fix instruction for the at least one locomotive;

downloading a set of undated operational parameters from the at least one locomotive, the set of updated operational parameters being measured after the second recommended fix instruction is performed; and closing the re-opened problem case if data indicative of the at least one failure condition is not contained in the updated set of operational parameters.

11. The method of claim 10 further comprising:

compiling a fault log for the problem case and storing it in a customer database, the fault log containing data indicative of the at least one failure condition.

12. The method of claim 11 further comprising the step of:
diagnosing the problem case by analyzing the fault log to identity a potential malfunctioning condition of the at least one locomotive.

13. The method of claim 12 further comprising the step of:
transmitting a first recommended fix instruction to the at least one locomotive, the recommended fix instruction prepared in response to the step of diagnosing.

14. The method of claim 10 further comprising:
receiving a first set of repair data at the remote control center, the first set of repair data indicative of whether a customer has executed the first recommended fix instruction; and
determining whether the first recommended fix instruction has been executed.

15. The method of claim 14 further comprising:
marking the electronic data file as executed if the first recommended fix instruction has been executed; and
time stamping the electronic data file with the time that the first recommended fix instruction was executed.

16. A method for determining whether to close a problem case associated with a machine for which a recommended fix instruction has been issued, the problem case being at least in part defined by an occurrence of at least one failure condition of the machine, the method comprising:
accessing a customer database to determine whether the recommended fix instruction has been executed in association with the machine;
determining whether data indicative of the at least one failure condition is contained in a first set of operational data, the first set of operational data indicative of a set of operational parameters associated with the machine wherein the set of operational parameters are established after the recommended fix instruction has been executed;
closing the problem case if the data indicative of the at least one failure condition is not contained in the first set of data;
creating an electronic data file associated with the problem case;
marking the electronic data file as a failure if the recommended fix instruction did not repair the at least one failure condition;
re-opening the problem case in the event the recommended fix instruction did not repair the at least one failure condition;
transmitting a second recommended fix instruction for the at least one locomotive;
downloading a set of updated operational parameters from the at least one locomotive, the set of updated operational parameters being measured after the second recommended fix instruction is performed; and
closing the re-opened problem case if data indicative of the at least one failure condition is not contained in the updated set of operational parameters.

17. The method of claim 16, the step of accessing a customer database comprising:
receiving a first set of repair data at a service center remote from the machine, the first set of repair data indicative of whether the recommended fix instruction has been executed in association with the machine; and
evaluating the first set of repair data to determine whether the recommended fix instruction has been executed.

18. The method of claim 17 further comprising:
requesting the first set of repair data to be transmitted from the machine to the service center.

19. The method of claim 16 further comprising:
downloading the first set of operational data from the machine to a remote service center; and
storing the first set of operational data in a machine database at the remote service center.

20. The method of claim 16 further comprising:
creating an electronic data file for tracking events associated with the problem case;
storing the electronic data file in the customer database; and
marking the electronic data file as executed if the recommended fix instruction has been executed.

21. The method of claim 20 further comprising:
time stamping the electronic data tile with a time that the recommended fix instruction was executed; and
the step of closing the problem case further comprising closing the problem case only if the data indicative of the at least one failure condition is not contained in the first set of data within a predetermine period of time measured from the time the recommended fix instruction was executed.

22. The method of claim 16 further comprising:
downloading a second set of operational data from the machine to a remote service center, the second set of operational data indicative of the set of operational parameters wherein the operational parameters are established prior to the recommended fix instruction being executed;
storing the second set of operational data in a database at the service center;
retrieving the second set of operational data with a processor, the processor configured to analyze the second set of operational data to determine whether data indicative of the at least one failure condition is contained in the second set of aperational data; and
instructing the processor to issue the recommended fix instruction if data indicative of the at least one failure condition is contained in the second set of operational data, the recommended fix instruction based on at least the at least one failure condition.

23. The method of claim 22 further comprising:
downloading the first set of operational data from the machine to the remote service center; and
storing the first set of operational data in the database at the service center.

24. A computerized system for determining whether to close a problem case associated with a machine for which a recommended fix instruction has been issued, the problem case being at least in part defined by an occurrence of at least one failure condition of the machine, the system comprising:
a first processor onboard the machine, the first processor configured to monitor and store a set of data indicative of a set of operational parameters associated with the machine;
a first database onboard the machine for storing the set of data;
a second processor at a service center remote from the machine, the second processor configured to receive the set of data downloaded from the first processor;
a second database at the remote service center for storing the set of data;
the second processor further configured to analyze the set of data to determine whether data indicative of the at least one failure condition is contained in the set of data after the recommended fix instruction has been executed;
the second processor further configured to close the problem case if data indicative of the at least one failure condition is not contained in the set of data;
a module for creating an electronic data file associated with the problem case;

a module for marking the electronic data file as a failure if the recommended fix instruction did riot repair the at least one failure condition;

a module for re-opening the problem case in the event the recommended fix instruction did not repair the at least one failure condition;

a module for transmitting a second recommended fix instruction for the at least one locomotive if the at least one failure condition is contained in the second set of data;

a module for downloading a set of updated operational parameters from the least one locomotive to the service center if data indicative of the at least one failure condition is contained in the second set of data; and a module for closing the re-opened problem case if data indicative of the at least one failure condition is not contained in the updated set of operational parameters.

25. A computer program product comprising a computer-usable medium having executable computer-readable code therein for managing data to determine whether to close a problem case associated with at least one locomotive, said computer-readable code comprising:

computer-readable code for downloading a first set of data from the at least one locomotive to a remote control center, the first set of data indicative that the problem case exists in association with the at least one locomotive;

computer-readable code for identifying at least one failure condition associated with the problem case;

computer-readable code for downloading a second set of data from the at least one locomotive to the remote control center, the second set of data indicative of a set of operational parameters associated with the at least one locomotive, the second set of operational parameters being determined after a first recommended fix instruction has been executed in relation to the at least one locomotive;

computer-readable code for closing the problem case if the at least one failure condition is not contained in the second set of data;

computer-readable code for creating an electronic data file associated with the problem case;

computer-readable code for marking the electronic data file as a failure if the recommended fix instruction did not repair the at least one failure condition;

computer-readable code for re-opening the problem case in the event the recommended fix instruction did not repair the at least one failure condition;

computer-readable code for transmitting a second recommended fix instruction for the at least one locomotive if the at least one failure condition is contained in the second set of data;

computer-readable code for downloading a set of updated operational parameters from the at least one locomotive to the remote control center if data indicative of the at least one failure condition is contained in the second set of data; and computer-readable code for closing the re-opened problem case if data indicative of the at least one failure condition is not contained in the updated set of operational parameters.

* * * * *